(12) United States Patent
Tanaka

(10) Patent No.: US 7,158,466 B2
(45) Date of Patent: Jan. 2, 2007

(54) MULTILAYER OPTICAL RECORDING MEDIUM, METHOD FOR RECORDING DATA, AND RECORDER

(75) Inventor: Toshifumi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 157 days.

(21) Appl. No.: 10/496,002

(22) PCT Filed: Nov. 28, 2002

(86) PCT No.: PCT/JP02/12467

§ 371 (c)(1),
(2), (4) Date: May 27, 2004

(87) PCT Pub. No.: WO03/046902

PCT Pub. Date: Jun. 5, 2003

(65) Prior Publication Data

US 2005/0002308 A1   Jan. 6, 2005

(30) Foreign Application Priority Data

Nov. 28, 2001   (JP) .............................. 2001-362815

(51) Int. Cl.
*G11B 7/10* (2006.01)
(52) U.S. Cl. ...................... 369/94; 369/275.3
(58) Field of Classification Search ................ 369/94, 369/275.1, 275.3, 47.27
See application file for complete search history.

(56) References Cited

U.S. PATENT DOCUMENTS 5,255,262 A   10/1993   Best et al.
5,608,715 A *   3/1997   Yokogawa et al. ...... 369/275.1
6,424,614 B1 *   7/2002   Kawamura et al. ...... 369/275.3

FOREIGN PATENT DOCUMENTS

| JP | 04-078033 | 3/1992 |
| JP | 05-151644 | 6/1993 |
| JP | 11-025608 | 1/1999 |
| JP | 11-273082 | 10/1999 |
| JP | 11-312363 | 11/1999 |

OTHER PUBLICATIONS

English Language machine translation of JP 11-273082.
English Language Abstract of JP 05-151644.
English Language Abstract of JP 11-025608.
English Language Abstrct of JP 11-273082.
English Language Abstract of JP 11-312363.
English Language Abstract of JP 04-078033.

* cited by examiner

*Primary Examiner*—Nabil Hindi
(74) *Attorney, Agent, or Firm*—Greenblum & Bernstein, P.L.C.

(57) ABSTRACT

A write-once or rewritable multilayer optical recording medium according to the present invention includes an L1 recording layer and an L0 recording layer, in which data recording areas for recording data are respectively formed, laminated on one surface of a base, wherein a read-in area for recording the data management information of all the data recorded in the respective data recording areas of the L1 recording layer and the L0 recording layer is formed only in the L0 recording layer. This means that the data management information of all the data can be read out quickly by simply accessing the L0 recording layer and the recording and reading of the data can be executed quickly and easily.

10 Claims, 3 Drawing Sheets

MULTILAYER OPTICAL RECORDING MEDIUM, METHOD FOR RECORDING DATA, AND RECORDER

TECHNICAL FIELD

The present invention relates to a write-once or erasable multilayer optical recording medium that is constructed with N recording layers, which include data recording areas for recording data, formed in layers on at least one surface of a base, a method for recording data on this multilayer optical recording medium, and a recorder constructed so as to be able to record data in accordance with this recording method.

BACKGROUND ART

Much attention has been placed on optical recording media due to their high density and high capacity, and optical recording media are now used in a variety of applications. In particular, compared to standard removable magnetic recording media, optical recording media where data can be written once or rewritten by users (write-once optical recording media or rewritable optical recording media, hereinafter also generally referred to as "recordable optical recording media") can record a large amount of data and can also record and reproduce the data in a short time. For this reason, such recordable optical recording media are coming into widespread use as removable storage media. As one example, a recordable optical recording medium includes a recording layer composed of various areas such as a basic information recording area (recording information areas such as a PCA (Power Calibration Area) and PMA (Program Memory Area)), a lead-in area, a data recording area (information area), and a lead-out area. With this type of recordable optical recording medium, the recording or reproduction (reading) of data is carried out by irradiating the recording layer with a laser beam set at the recording power or a laser beam set at the reproduction power (hereinafter, when no distinction is made, both are referred to as the "laser beam"). Here, when data is recorded on this recordable optical recording medium, the medium is irradiated with a laser beam set at the recording power in accordance with a data content of the data to form pits, where the light reflectivity differs for a laser beam set at the reproduction power used to irradiate the medium during reproduction, in the recording layer. By forming such pits, data is recorded in the recording area and data management information showing recording positions of such data, filenames, and the like is recorded in the lead-in area.

On the other hand, the present applicant has developed a multilayer optical recording medium 51 shown in FIG. 7 as a recordable optical recording medium that can record a larger amount of data than a normal conventional recordable optical recording medium. As one example, this multilayer optical recording medium 51 is a single-sided, two-layer optical recording medium that is rewritable, and is constructed of an L1 recording layer 3, a spacer layer 4, an L0 recording layer 5, and a cover layer 6 that are formed in layers in the stated order on a base 2 in the form of a flat plate (in a disc shape, for example) that has a fitting center hole H formed in a center part. This multilayer optical recording medium 51 is provided with two recording layers, the L1 recording layer 3 and the L0 recording layer 5, so that compared to a conventional recordable optical recording medium, double the amount of the data can be recorded. In this case, the base 2 is manufactured using a resin material and has a fine minute convexes and concaves (not shown) of grooves (guide grooves), lands, and the like formed in a surface (the upper surface in FIG. 7) on the cover layer 6 side. The L1 recording layer 3 is constructed of layers, such as a reflective film that reflects a laser beam, a phase change film whose optical coefficient is changed by irradiation with a laser beam set at the recording power, and a protective film that protects the phase change layer, formed on the fine minute convexes and concaves of the base 2. The spacer layer 4 is formed of light transmitting resin, and has a fine minute convexes and concaves (not shown) of grooves, lands, and the like formed in the surface on the cover layer 6 side. The L0 recording layer 5 is composed of layers, such as a phase change film and a protective film, formed on the minute convexes and concaves on the spacer layer 4. The cover layer 6 is formed of a thin film of a light transmitting resin so as to cover the L0 recording layer 5. By irradiating this multilayer optical recording medium 51 with a laser beam in the direction shown by the arrow A in FIG. 7, data is recorded on the L0 recording layer 5 and the L1 recording layer 3 and is read from the L0 recording layer 5 and the L1 recording layer 3.

In this case, the L1 recording layer 3 and the L0 recording layer 5 of the multilayer optical recording medium 51 have approximately the same area structure as the recording layer of a normal conventional recordable optical recording medium. More specifically, the L1 recording layer 3 is constructed of a basic information recording area 3b, a lead-in area 3a, a data recording area 3c, and a lead-out area 3d formed in order from the inner periphery side. In the same way as the L1 recording layer 3, the L0 recording layer 5 is constructed of a basic information recording area 5b, a lead-in area 5a, a data recording area 5c, and a lead-out area 5d formed in order from the inner periphery side. In this case, the basic information recording area 3b is composed of a PCA, a PMA, and the like for the L1 recording layer 3, and the basic information recording area 5b is composed of a PCA, a PMA, and the like for the L0 recording layer 5. Also, data management information Dt for the data Dd, Dd, . . . recorded in the data recording area 3c is recorded in the lead-in area 3a and data management information Dt (TOC) for the data Dd, Dd, . . . recorded in the data recording area 5c is recorded in the lead-in area 5a.

When the data Dd, Dd, . . . are recorded on the multilayer optical recording medium 51, first the multilayer optical recording medium 51 is loaded into a recorder. In response to this, the recorder rotates the loaded multilayer optical recording medium 51 at a predetermined rotational velocity and moves a pickup above the lead-in areas 5a, 3a, and by emitting and focusing a laser beam in this state, sets the focal point of the laser beam on the lead-in area 5a, for example. Next, the recorder successively reads disc information Di recorded as wobble or pre-pits in the lead-in area 5a and the data management information Dt recorded as pits. At this time, based on the disc information Di, the recorder determines that this medium is a rewritable single-sided two-layer optical recording medium, and based on the data management information Dt the recorder specifies an empty area (an area in which data Dd has not been recorded) in the data recording area 5c and decides from which recording position the recording of data Dd is to start. Here, the data management information Dt is not recorded on a multilayer optical recording medium 51 that has not been used. Accordingly, when there is no data management information Dt in the lead-in area 5a, the recorder determines that the entire data recording area 5c is an empty area and decides to start recording the data Dd from the start position of the data recording area 5c. Also, on a multilayer optical recording medium 51 in whose data recording area 5c data Dd has already been recorded, data management information Dt showing the recording position of such data Dd is recorded in the lead-in area 5a. Accordingly, the recorder decides to start recording the data Dd from a start of an empty area specified based on the read data management information Dt. Next, the recorder moves the pickup to a position above the basic information recording area 5b and finds, according to a predetermined procedure, an appropriate laser power (recording power) for recording the data Dd onto the data recording area 5c.

After this, the recorder moves the pickup to a position above the lead-in areas 5a, 3a, and by emitting and focusing a laser beam in this state, the laser beam is focused on the lead-in area 3a. Next, the recorder reads the data management information Dt recorded using pits in the lead-in area 3a. Here, in the same way as when the recording starting position for the data recording area 5c is decided, based on the existence of the data management information Dt or the data content of the read data management information Dt, the recorder specifies an empty area of the data recording area 3c and decides from which recording position the recording of the data Dd is to start. Next, the recorder moves the pickup above the basic information recording area 3b and finds, according to a predetermined procedure, an appropriate laser power (recording power) for recording the data Dd onto the data recording area 3c. Next, the recorder moves the pickup above the data recording areas 5c, 3c, focuses on the data recording area 5c, for example, and then starts to record the data Dd, Dd, . . . from a start position of the data recording area 5c. In this case, when the data Dd has been recorded up to a final position of the data recording area 5c, the recorder focuses on the data recording area 3c and then continues the recording of the data Dd, Dd, . . . from the start position of the data recording area 3c. When the recording of all of the data Dd, Dd, . . . has been completed, the recorder moves the pickup above the lead-in areas 5a, 3a and focuses on the lead-in area 5a. Next, the recorder records data management information Dt on the data Dd, Dd, . . . recorded in the data recording area 5c in the lead-in area 5a. In the same way, the recorder then focuses on the lead-in area 3a and then records data management information Dt on the data Dd, Dd, . . . recorded in the data recording area 3c in the lead-in area 3a. By doing so, the recording of the data Dd, Dd, . . . on the multilayer optical recording medium 51 is completed.

DISCLOSURE OF THE INVENTION

By investigating the multilayer optical recording medium 51 described above, the present inventor discovered the following problem to be solved. That is, to make it possible to record a large amount of recording data, the multilayer optical recording medium 51 includes two recording layers, the L0 recording layer 5 and the L1 recording layer 3, formed with approximately the same area construction as the recording layer of a normal conventional recordable optical recording medium. For this reason, when recording the data Dd, Dd, . . . , data management information Dt on the data Dd recorded in the data recording area 5c is recorded in the lead-in area 5a and data management information Dt on the data Dd recorded in the data recording area 3c is recorded in the lead-in area 3a. Accordingly, to decide from which recording position in the data recording areas 5c, 3c the recording of the data Dd is to start, it is necessary to read the respective data management information Dt from both of the lead-in areas 5a, 3a. In this case, time is required for focusing on both the lead-in areas 5a, 3a, and there is the problem of how to reduce such time.

In the multilayer optical recording medium 51, when data Dd, Dd, . . . has been recorded in both the data recording areas 5c, 3c, the data management information Dt on the data Dd, Dd, recorded in the data recording area 5c is recorded in the lead-in area 5a and the data management information Dt on the data Dd, Dd, recorded in the data recording area 3c is recorded in the lead-in area 3a. This means that when the recording of the data Dd, Dd, . . . has been completed (when recording the data management information Dt), it is necessary to focus on both the lead-in areas 5a, 3a in order, and as some time is required for focusing, there is the problem of how to reduce such time. Also, when reading the data Dd, Dd, . . . recorded on the multilayer optical recording medium 51, it is necessary to read the data management information Dt, Dt from both the lead-in areas 5a, 3a and to specify the recording positions of the data Dd, Dd, . . . This means that in the same way as the recording process, during a reproduction process (a read of the data Dd), some time is required for focusing, so that there is the problem of how to reduce such time.

In this multilayer optical recording medium 51, the L0 recording layer 5 and the L1 recording layer 3 have approximately the same area construction, so that the lead-in areas 5a, 3a are in overlapping positions in the thickness direction of the multilayer optical recording medium 51. Accordingly, as shown in FIG. 8, when focusing on the lead-in area 5a for example, the focus position of an emitted laser La (a laser beam) is gradually moved in the direction shown by the arrow B from the base 2 side (the point P5), with the laser beam becoming focused on the lead-in area 3a (the point P4) before becoming focused on the lead-in area 5a (the point P2). This means that based on the reflection level of the emitted laser La, the recorder can erroneously determine that the laser La is focused on the lead-in area 5a and end up focusing on the lead-in area 3a when trying to focus on the lead-in area 5a. When the focus position is gradually moved in the direction shown by the arrow A from the cover layer 6 side (the point P1) towards the lead-in area 5a, there are cases when the focus point is moved beyond the point P2 without focusing on the lead-in area 5a to points P3, P4 . . . (so-called "overruns"). In such cases, when the focus position has moved to the point P4, the recorder can erroneously determine that the laser La is focused on the lead-in area 5a, and may end up focusing on the lead-in area 3a when trying to focus on the lead-in area 5a. Accordingly, such problems should preferably be solved.

The present invention was conceived in view of the above problem to be solved and it is a principal object of the present invention to provide a multilayer optical recording medium, a method for recording data, and a recorder that can record and read data quickly and easily. It is another object of the present invention to provide a multilayer optical recording medium, a method for recording data, and a recorder for which it is possible to reliably and easily focus on a data management information recording area.

A multilayer optical recording medium according to the present invention is a write-once or rewritable multilayer optical recording medium constructed with N (where N is a natural number of 2 or greater) recording layers, in which data recording areas for recording data are respectively formed, laminated on at least one surface of a base, wherein a data management information recording area for recording data management information on all of the data recorded in the respective data recording areas of the respective recording layers is formed on only one recording layer out of the N recording layers.

According to this multilayer optical recording medium, a data management information recording area, for recording data management information on all of the data recorded in respective data recording areas of respective recording layers, is formed on only one out of the N recording layers, so that by merely accessing one data management information recording area, it is possible to quickly read data management information on all of the data recorded on the multilayer optical recording medium. This means that it is possible to quickly and easily decide the recording start position of the data and also possible to considerably reduce the overall processing time of the recording process including the recording of the data management information. When reproducing the data recorded on the multilayer optical recording medium, the recorded data can be quickly and easily reproduced by merely reading the data management information from one data management information recording area.

In this case, it is preferable that the data management information recording area is formed in a first recording layer counting from a direction of emission of a laser beam used to irradiate the multilayer optical recording medium during reproduction or a laser beam used to irradiate the multilayer optical recording medium during recording. By doing so, by successively moving the focus position of the laser beam in a direction of emission of the laser beam used for irradiation during recording, it is possible to set the focal point quickly during focusing on this multilayer optical recording medium.

It is also preferable for the data management information recording area to be formed at a position that does not overlap the respective data recording areas of the respective recording layers in a thickness direction of the multilayer optical recording medium. By doing so, when focusing on the data management information recording area, it is possible to reliably and easily focus on the data management information recording area regardless of the direction in which the focus position is moved.

A method for recording data according to the present invention records data on a write-once or rewritable multilayer optical recording medium constructed with N (where N is a natural number of 2 or greater) recording layers, in which data recording areas for recording the data are respectively formed, laminated on at least one surface of a base, the method setting a data management information recording area for recording data management information on the data recorded in the respective data recording areas of the respective recording layers on only one recording layer out of the N recording layers, recording the data in the respective data recording areas, and recording data management information on all of the recorded data in the data management information recording area.

With this method for recording data, data management information on all of the data recorded on the multilayer optical recording medium can be read quickly by merely accessing one data management information recording area, so that the recording start position of the data can be decided quickly and easily and the overall processing time of the recording process including the recording of the data management information can be considerably reduced. During the reproduction of the recording data, it is also possible to quickly and easily reproduce the data by reading the data management information from one data management information recording area.

In this case, when focusing in the data management information recording area during the recording of the data, it is preferable to successively move the focus position of the laser beam along the direction of emission of the laser beam emitted during recording. By doing so, it is possible to prevent contact between the lower end part of the pickup (recording means) and the surface of the multilayer optical recording medium.

It is also preferable to set the data management information recording area in a first recording layer counting from a direction of emission of a laser beam used to irradiate the multilayer optical recording medium during reproduction or a laser beam used to irradiate the multilayer optical recording medium during recording. When focusing on a multilayer optical recording medium where the data management information recording area is formed in the first recording layer counting from a direction of emission of a laser beam used to irradiate the multilayer optical recording medium during reproduction or a laser beam used to irradiate the multilayer optical recording medium during recording, it is possible to set the focal point in a short time.

A recorder according to the present invention is constructed so as to be capable of recording the data and the data management information on a multilayer optical recording medium using the method of recording described above, the recorder including: recording means for recording the data and the data management information on the multilayer optical recording medium; and a recording control unit for controlling a recording process carried out by the recording means, wherein the recording control unit has the recording means record the data management information on all of the data recorded on the multilayer optical recording medium in a data management information recording area set in one recording layer out of the N recording layers.

In this recorder, the recording control unit has the recording means record the data management information on all of the data recorded on the multilayer optical recording medium in a data management information recording area set in one recording layer out of the N recording layers, so that it is possible to quickly and easily record and reproduce data.

It should be noted that the disclosure of the present invention relates to a content of Japanese Patent Application 2001-362815 that was filed on 28 Nov. 2001 and the entire content of which is herein incorporated by reference.

BEST MODE FOR CARRYING OUT THE INVENTION

Figure 1:
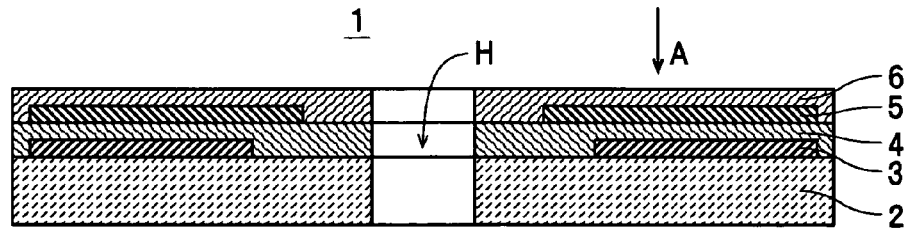
FIG. 1 is a side cross-sectional view showing the construction of a multilayer optical recording medium 1 according to an embodiment of the present invention.

A preferred embodiment of a multilayer optical recording medium, a method for recording data, and a recorder according to the present invention will now be described with reference to the attached drawings.

First, a multilayer optical recording medium 1 that is one example of a multilayer optical recording medium according to the present invention will be described with reference to the drawings. It should be noted that component elements that are the same as the multilayer optical recording medium 51 that has already been developed by the applicant have been assigned the same reference numerals and redundant description has been omitted.

The multilayer optical recording medium 1 is a so-called single-sided two-layer optical recording medium (a rewritable optical recording medium) with two (one example of "N layers" for the present invention) recording layers (phase change recording layers, for example) formed of an inorganic material, and as shown in FIG. 1, an L1 recording layer 3, a spacer layer 4, an L0 recording layer 5, and a cover layer 6 are formed in layers on a base 2. The base 2 is formed as a flat plate (in a disc shape, for example) using an organic material (for example, a resin material such as polycarbonate), with laser beam-guide grooves (not shown) and lands (not shown) and the like being formed in spirals as a fine minute convexes and concaves in one surface (the upper surface in FIG. 1) of the base 2 from a central periphery towards an outer edge part. The L1 recording layer 3 is constructed of layers, such as a reflective film, a phase change film, and a protective film formed on the grooves, lands, and the like formed in the surface of the base 2. In this case, the reflective film is formed as a thin layer by sputtering a metal material, while the phase change film and the protective film are formed by sputtering inorganic materials.

The spacer layer 4 is formed of light transmitting resin (more specifically an energy-beam curable resin (for example, a UV curable resin) with a light transmitting characteristic) as an organic material, and has a fine minute convexes and concaves (not shown) of grooves, lands, and the like formed in the surface on the cover layer 6 side. The L0 recording layer 5 is composed of layers such as a phase change film and a protective film formed on the grooves, lands, and the like formed on the surface of the spacer layer 4. The cover layer 6 is a layer that prevents scratching of the L0 recording layer 5 and the like, adjusts the thickness of the entire multilayer optical recording medium 1, and also functions as a part of an optical path of a laser beam, and is formed of a light transmitting resin (more specifically an energy-beam curable resin (for example, a UV curable resin) with a light transmitting characteristic) as an organic material.

Figure 2:
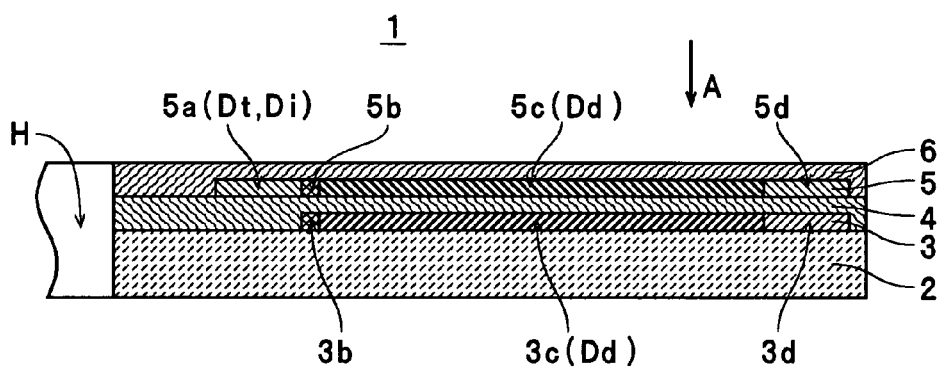
FIG. 2 is a side cross-sectional view showing the area construction inside the L0 recording layer 5 and the L1 recording layer 3 of this multilayer optical recording medium 1.

In this case, as shown in FIG. 2, the L1 recording layer 3 is constructed of a basic information recording area 3b, a data recording area 3c, and a lead-out area 3d formed in order from the inner periphery side. The L0 recording layer 5 is formed of a lead-in area 5a, a basic information recording area 5b, a data recording area 5c, and a lead-out area 5d formed in order from the inner periphery side. In this case, the data recording areas 5c, 3c correspond to data recording areas for the present invention and the lead-in area 5a corresponds to a data management information recording area for the present invention. On the multilayer optical recording medium 1, an innermost part (that is, the lead-in area 5a) of the L0 recording layer 5 is formed closer to the inside than an innermost part (that is, the basic information recording area 3b) of the L1 recording layer 3. Accordingly, the lead-in area 5a is formed at a position where the respective data recording areas 3c, 5c of the respective recording layers 3, 5 do not overlap in the thickness direction of the multilayer optical recording medium 1. Also, data management information Dt for all of the data Dd, Dd, . . . recorded on the multilayer optical recording medium 1 (that is, the data Dd, Dd, recorded on both data recording areas 3c, 5c) is recorded in the lead-in area 5a. It should be noted that in the same way as the multilayer optical recording medium 51 developed by the present applicant, by irradiating this multilayer optical recording medium 1a with a laser beam in the direction of the arrow A of FIG. 2, data Dd, Dd, . . . are recorded on the L0 recording layer 5 and the L1 recording layer 3 and the data Dd, Dd, . . . are read from the L0 recording layer 5 and the L1 recording layer 3.

Figure 3:
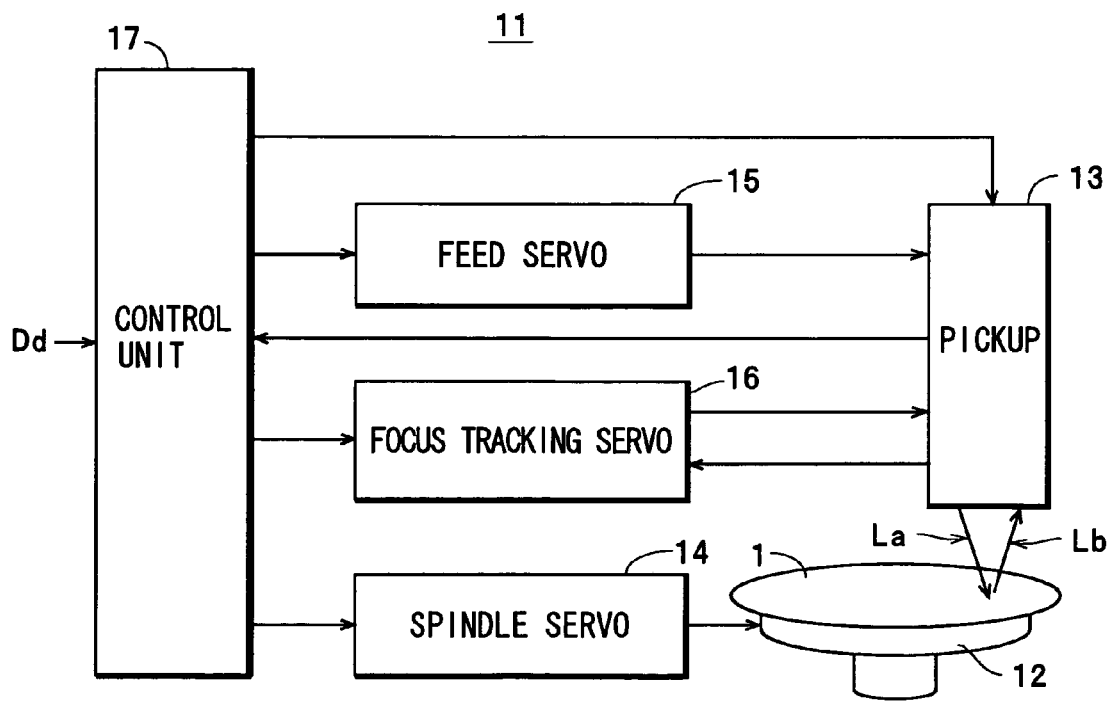
FIG. 3 is a block diagram showing the construction of a recording/reproducing apparatus 11 according to the embodiment of the present invention.

Next, a recording/reproducing apparatus 11 constructed so as to be capable of recording the data Dd, Dd on the multilayer optical recording medium 1 will be described with reference to FIG. 3.

The recording/reproducing apparatus 11 corresponds to the recorder according to the present invention and is constructed so as to be able to record the data Dd, Dd, . . . in accordance with the method for recording data according to the present invention. The recording/reproducing apparatus 11 includes a turntable 12, a pickup (recording means) 13, a spindle servo 14, a feed servo 15, a focus tracking servo 16, and a control unit 17. In this case, the turntable 12 is formed in the shape of a disc on which the multilayer optical recording medium 1 can be mounted and as described later, is rotated by a spindle motor (not shown) driven and controlled by the spindle servo 14 so that the multilayer optical recording medium 1 is rotated with a constant linear velocity.

The pickup 13 is integrally constructed with a laser emitting part and a laser receiving part. Under the control of the control unit 17, a laser is driven by a laser driver (neither is shown), and a laser beam set at the recording power during recording and a laser beam set at the reproducing power during reproduction is emitted (both are referred to as the "emitted laser La") onto the multilayer optical recording medium 1. By doing so, pits are recorded in the L0 recording layer 5 or the L1 recording layer 3 (the data Dd, the data management information Dt, or the like is recorded), or an electric signal is outputted in accordance with a level of a reflected laser Lb that has been reflected by parts where pits have been recorded. In this case, during the recording of the data Dd, under the control of the control unit 17, the laser driver of the pickup 13 adjusts the emission power of the emitted laser La so as to become a predetermined emission power. The pickup 13 also includes an objective lens and a half mirror (neither is shown) and focuses the emitted laser La on the L0 recording layer 5 or the L1 recording layer 3 of the multilayer optical recording medium 1. More specifically, the objective lens is subjected to focus tracking controlled by the focus tracking servo 16, and by doing so, the emitted laser La is focused on the L0 recording layer 5 or the L1 recording layer 3 of the multilayer optical recording medium 1. The pickup 13 is moved reciprocally by the feed servo 15 in a radial direction of the multilayer optical recording medium 1 between the inner periphery side and the outer periphery side.

Under the control of the control unit 17, the spindle servo 14 controls the rotation of the spindle motor (that is the rotation of the turntable 12 and the multilayer optical recording medium 1) so that the linear velocity becomes a fixed velocity in a range of 9 m/s to 25 m/s inclusive, for example. The control unit 17 corresponds to the recording control unit for the present invention, and in addition to controlling the driving of the pickup 13, the spindle servo 14, the feed servo 15, and the focus tracking servo 16, reads the data Dd, Dd, the data management information Dt, or the like recorded on the L0 recording layer 5 and the L1 recording layer 3 based on the electric signal outputted from the pickup 13. When the multilayer optical recording medium 1 is loaded in the recording/reproducing apparatus 11, the control unit 17 drives and controls the pickup 13 to first read various information, such as disc information Di and recommended power data, recorded as wobble or pre-pits in the lead-in area 5a. At this time, based on the read disc information Di, it is determined that the loaded medium is a rewritable single-sided two-layer optical recording medium, and based on the read recommended power data, and a recommended value relating to the emission power of the emitted laser La when recording the data Dd is specified.

Next, the method for recording data according to the present invention will be described with reference to the drawings, for an example of a method for recording the data Dd, Dd, . . . on an unused multilayer optical recording medium 1 (a blank disc).

Figure 4:
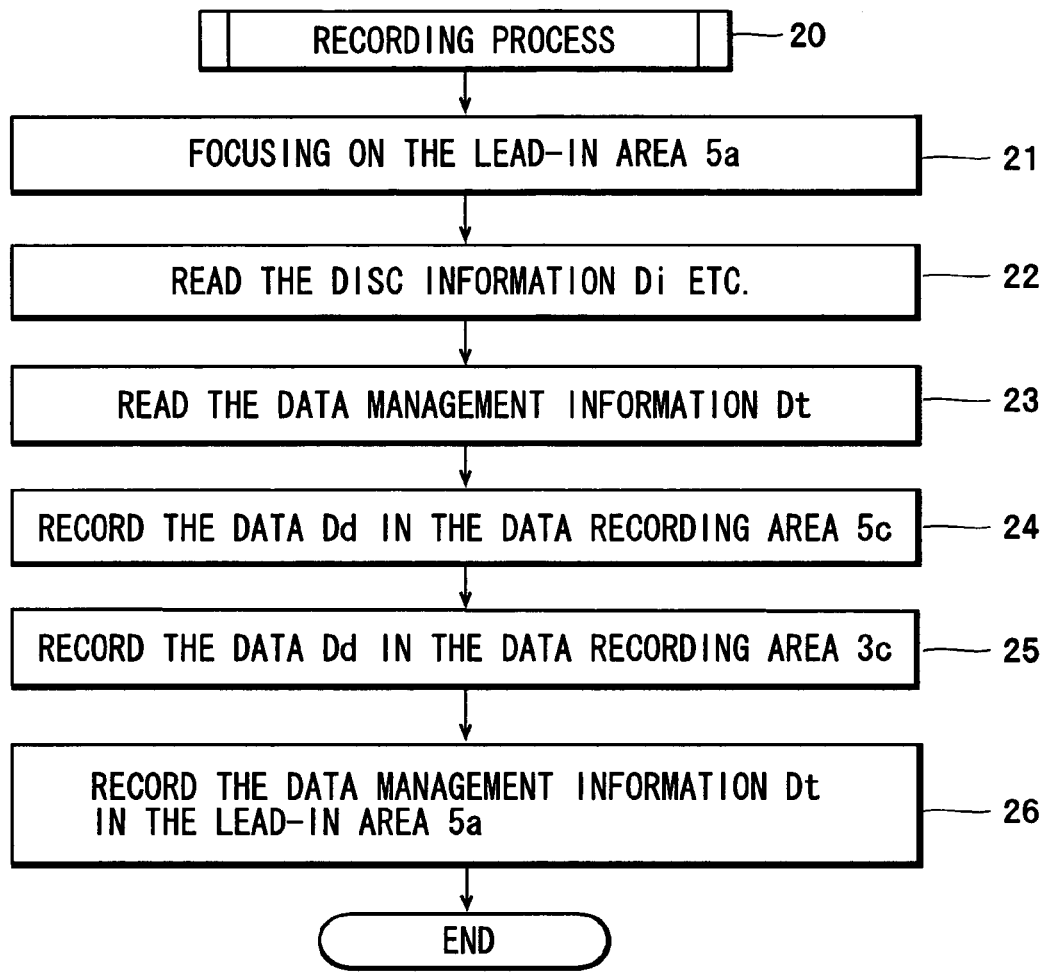
FIG. 4 is a flowchart of a recording process 20 executed by the recording/reproducing apparatus 11.
Figure 5:
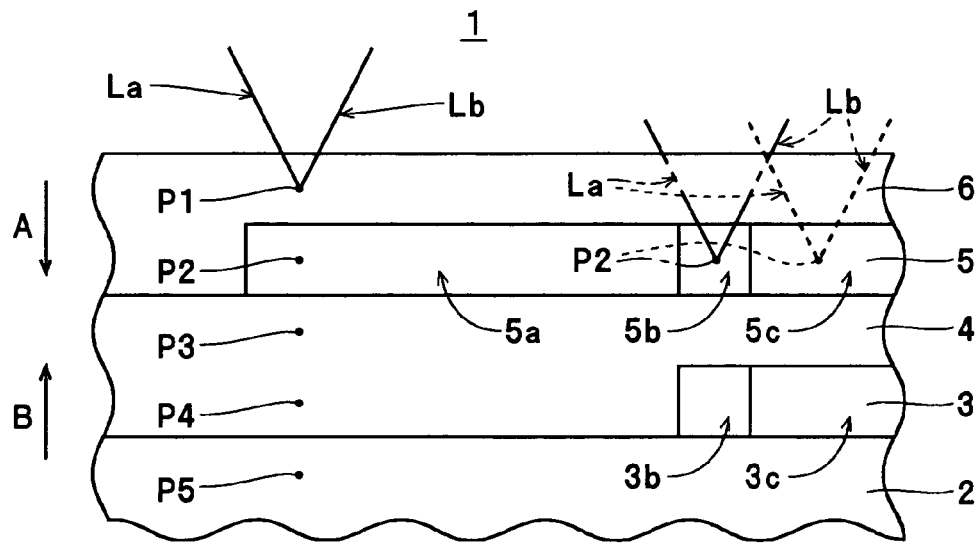
FIG. 5 is a side cross-sectional view showing the focus positions (points P1 to P5) of the emitted laser La when focusing on the multilayer optical recording medium 1.

First, the multilayer optical recording medium 1 onto which the data Dd is to be recorded is loaded into the recording/reproducing apparatus 11. In response to this, the control unit 17 of the recording/reproducing apparatus 11 executes a recording process 20 shown in FIG. 4. In this recording process 20, the control unit 17 first carries out driving control of the spindle servo 14 so that the turntable 12 is rotated at a fixed linear velocity of 9 m/s, for example, and drives and controls the feed servo 15 to move the pickup 13 above the lead-in area 5a. Next, the control unit 17 drives and controls the pickup 13 to emit the emitted laser La and drives and controls the focus tracking servo 16 to focus on the lead-in area 5a (step 21). At this time, the focus tracking servo 16 adjusts the focus position of the emitted laser La in accordance with a predetermined procedure. More specifically, as shown in FIG. 5, the focus position of the emitted laser La is gradually moved from the cover layer 6 side (the point P1) in the direction of the arrow A (that is, the irradiation direction of the emitted laser La) and it is determined whether the focal point has been set on the L0 recording layer 5 based on the received state of a reflected laser Lb reflected at a surface of the L0 recording layer 5 (the lead-in area 5a), at an interface of the L0 recording layer 5 and the spacer layer 4, and the like. In this case, as described above, the multilayer optical recording medium 1 is constructed so that the L1 recording layer 3 is not present at a position that overlaps the lead-in area 5a in the thickness direction of the multilayer optical recording medium 1. Accordingly, even if the lead-in area 5a (the point P2) is overrun and the focus position is moved to the points P3, P4, . . . no focus point will not be set at a point aside from the L0 recording layer 5, so that the emitted laser La can be reliably focused on the lead-in area 5a.

Next, the control unit 17 reads the disc information Di, the recommended power data, and the like from the lead-in area 5a (step 22) and then reads the data management information Dt recorded using pits in the lead-in area 5a (step 23). At this time, based on the read data management information Dt, the control unit 17 specifies the empty areas (areas in which data Dd has not been recorded) of the data recording areas 5c, 3c and determines from which of the recording positions the recording of the data Dd is to start. In this case, with the multilayer optical recording medium 1, since data management information Dt on all of the data Dd, Dd, . . . that has been recorded on the multilayer optical recording medium 1 (that is, the data Dd, Dd, . . . recorded in both data recording areas 5c, 3c) is recorded altogether in the lead-in area 5a, by merely reading the data management information Dt recorded in the lead-in area 5a, it is possible to specify the empty areas on the entire multilayer optical recording medium 1 (in both data recording areas 5c, 3c). It should be noted that since no data management information Dt is recorded on an unused multilayer optical recording medium 1, when there is no data management information Dt in the lead-in area 5a, the control unit 17 determines that data Dd is not recorded on either of the data recording areas 5c, 3c, and decides to start the recording of the data Dd from the start of the data recording area 5c, for example.

Next, the control unit 17 drives the feed servo 15 to move the pickup 13 to a position above the basic information recording area 5b and determines, according to a predetermined procedure, the appropriate laser power for the emitted laser La when recording the data Dd on the data recording area 5c. More specifically, pits are test written at a predetermined position inside the basic information recording area 5b at an emission power (an emission power corresponding to a recommended value) specified based on the recommended power data read from the lead-in area 5a, and a fine adjustment is made of the emission power of the emitted laser La. On the multilayer optical recording medium 1, the basic information recording area 5b is formed next to the lead-in area 5a, so that at this point the recording/reproducing apparatus 11 can focus on the basic information recording layer 5b by merely moving the pickup 13 in the radial direction of the multilayer optical recording medium 1 with the pickup 13 still focused on the lead-in area 5a (i.e., the emitted laser La is in the focused state shown by the dot-dash line in FIG. 5). It should be noted that this test writing in the basic information recording area 5b is not always necessary, and when the data Dd, Dd, . . . are recorded at a low speed, such as quad speed, on the multilayer optical recording medium 1, it is also possible to set the emission power specified based on the recommended power data as the emission power of the emitted laser La when recording the data Dd.

Next, the control unit 17 drives and controls the feed servo 15 and moves the pickup 13 to a position above the data recording area 5c to start the recording of the data Dd, Dd, . . . (step 24). At this time, since the data recording area 5c is formed next to the basic information recording area 5b on the multilayer optical recording medium 1, the recording/reproducing apparatus 11 can focus on the data recording area 5c by merely moving the pickup 13 in the radial direction of the multilayer optical recording medium 1 with the pickup 13 still focused on the basic information recording area 5b (i.e., the emitted laser La is in the focused state shown by the dot-dash line in FIG. 5). In this way, it is possible to start recording the data Dd, Dd by focusing only once on the lead-in area 5a as described above.

On the other hand, when the data Dd, Dd has been recorded up to a final position of the data recording area 5c, the control unit 17 records the remaining data Dd, Dd, . . . in the data recording area 3c (step 25). At this time, the control unit 17 controls and drives the feed servo 15 to move the pickup 13 above the basic information recording areas 5b, 3b, and then drives and controls the focus tracking servo 16 to focus on the basic information recording area 3b. Next, the control unit 17 test writes pits at a predetermined position inside the basic information recording area 3b at an emission power specified based on the recommended power data and the emission power of the emitted laser La is finely adjusted to the optimal power for recording the data Dd in the data recording area 3c. In this case, in the same way as the test writing in the basic information recording layer 5b, this test writing in the basic information recording area 3b is not always necessary, and it is also possible to set an emission power specified based on the recommended power data as the emission power of the emitted laser La for recording the data Dd. At this time, instead of focusing on the basic information recording area 3b, focusing is carried out directly on the data recording area 3c.

After this, when the recording of all of the data Dd, Dd, . . . is completed, the control unit 17 moves the pickup above the lead-in area 5a and focuses on the lead-in area 5a. Next, the control unit 17 records data management information Dt for all of the data Dd, Dd, . . . recorded in both the data recording areas 5c, 3c (that is all of the data Dd, Dd, . . . recorded on the multilayer optical recording medium 1) in the lead-in area 5a (step 26). By doing so, the recording of the data Dd, Dd, . . . on the multilayer optical recording medium 1 is completed.

In this way according to the multilayer optical recording medium 1, a data management information recording area (the lead-in area 5a) for recording the data management information Dt on all of the data Dd, Dd recorded in the data recording area 5c, 3c is provided on only one (in this case, the L0 recording layer 5) out of the L0 recording layer 5 and the L1 recording layer 3, so that data management information Dt on all of the data Dd, Dd recorded on the multilayer optical recording medium 1 is recorded altogether in the lead-in area 5a and by merely accessing the lead-in area 5a, it is possible to quickly specify the empty areas in the data recording areas 5c, 3c. As a result, it is possible to quickly and easily specify the recording start position of the data Dd. In this case, since the data management information Dt on the recorded data Dd, Dd, . . . is recorded in only the lead-in area 5a, the processing time required for the entire recording process that includes the recording of the data management information Dt can be considerably reduced. Also, when reproducing the data Dd, Dd, . . . (reading the data Dd, Dd, . . . ) recorded on the multilayer optical recording medium 1, the recording positions of all of the data Dd, Dd, . . . can be specified by merely accessing the lead-in area 5a and reading the data management information Dt, so that the data Dd can be reproduced quickly and easily.

In addition, according to this multilayer optical recording medium 1, the lead-in area 5a is provided in the first recording layer (in this case, the recording layer L0) when counting from the direction of emission of the laser beam emitted during reproduction or the laser beam emitted during recording (the emitted laser La), so that by successively moving the focus position of the emitted laser La in the direction of emission of the emitted laser La, when focusing on the multilayer optical recording medium 1, the lead-in area 5a at which the focal point should be set first is positioned on the nearside in the emission direction, so that focusing can be achieved in a short time. Also, when focusing on the multilayer optical recording medium 1, the focus position is moved along the direction of emission of the emitted laser La (that is, from the cover layer 6 side towards the base 2 side), so that as described later, the lower end part of the pickup is effectively prevented from contacting the surface of the cover layer 6. Also, according to this multilayer optical recording medium 1, the lead-in area 5a is formed at a position where the respective recording layers 3, 5 do not overlap one another in the thickness direction of the multilayer optical recording medium 1, so that when focusing on the lead-in area 5a, it is possible to reliably focus on the lead-in area 5a regardless of in which of the directions shown by the arrows A, B in FIG. 5 the focus position is moved.

Also, according to the method of recording the data Dd by the recording/reproducing apparatus 11 described above, the data management information Dt on the data Dd, Dd, . . . recorded in the data recording area 5c, 3c is recorded altogether in the lead-in area 5a, so that it is sufficient to record the data management information Dt in only the lead-in area 5a, so that the processing time for the entire recording process including the recording of the data management information Dt can be considerably reduced. With the multilayer optical recording medium 1 on which the data Dd, Dd, . . . has been recorded by this recording method, when reproducing this medium 1 (reading the data Dd, Dd, . . . ), by merely accessing the lead-in area 5a and reading the data management information Dt, it is possible to specify the recording positions of all the data Dd, Dd, . . . , so that the data Dd can be reproduced quickly and easily. In addition, when new data Dd is additionally written onto a multilayer optical recording medium 1 on which data Dd has been recorded according to this recording method, by merely accessing the lead-in area 5a, the empty areas of the data recording areas 5c, 3c can be specified, so that it is possible to quickly and easily determine the recording start position of the new data Dd.

According to this method of recording, by successively moving the focus position along the direction of emission of the emitted laser La when focusing on the lead-in area 5a at the start of recording of the data Dd, it is possible to sufficiently prevent contact between the pickup and the cover layer 6 during focusing. More specifically, for recent optical recording media, the use of a blue laser beam as the emitted laser La is being investigated to increase the recording density of the data Dd, Dd, . . . . A pickup that can emit a blue laser beam uses a lens with a comparatively large numerical aperture (NA) so that in order to focus on the recording layer of the optical recording medium, the pickup needs to be brought close to the optical recording medium. Accordingly, by moving the focus position in order from the base 2 side (the point P5) in the direction shown by the arrow B in FIG. 5, in a state where the focal point has been set on the point P5, the clearance between the lower end part of the pickup and the surface of the cover layer 6 is around 0.1 mm. In this state, there is the risk of even a slight surface vibration in the multilayer optical recording medium 1 causing the pickup to contact the cover layer 6. On the other hand, when the focus position is successively moved along the direction of the emission of the emitted laser La (the direction of the arrow A in FIG. 5), the focal point is on the lead-in area 5a (the point P2) before the pickup becomes extremely close to the cover layer 6, so that it is possible to sufficiently prevent contact between the pickup and the cover layer 6.

Figure 6:
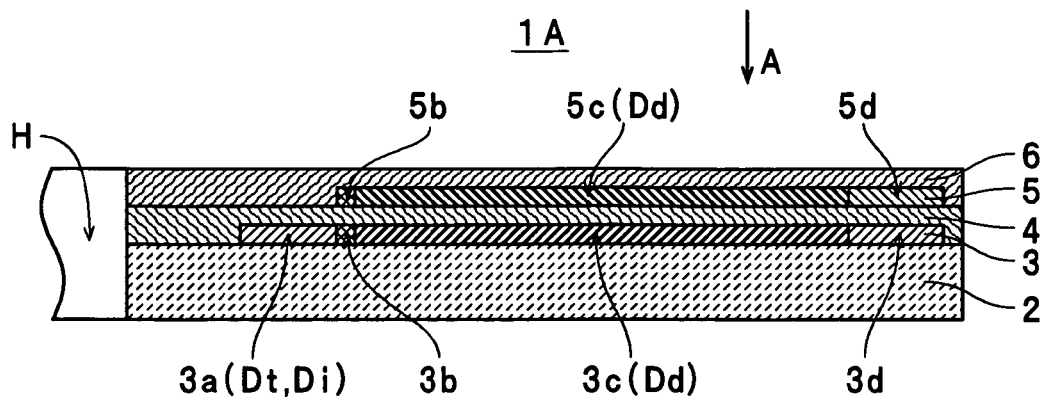
FIG. 6 is a side cross-sectional view showing the construction of a multilayer optical recording medium 1A according to another embodiment of the present invention.
Figure 7:
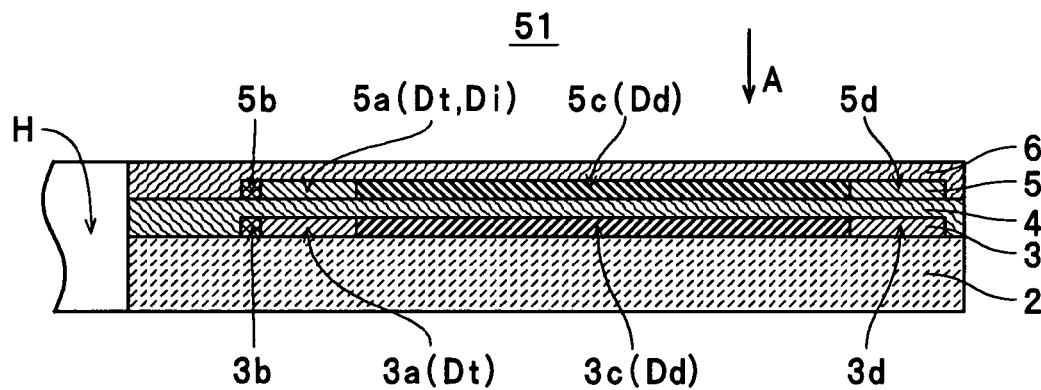
FIG. 7 is a side cross-sectional view showing the construction of a multilayer optical recording medium 51 already developed by the applicant.
Figure 8:
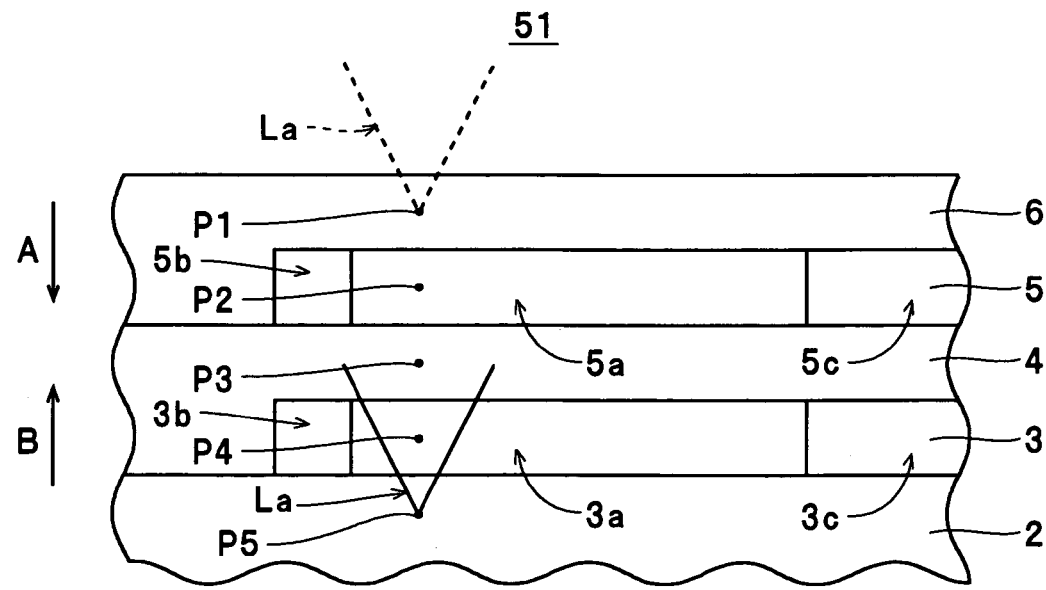
FIG. 8 is a side cross-sectional view showing focus positions (points P1 to P5) of the emitted laser La when focusing on the multilayer optical recording medium 51.

It should be noted that the present invention is not limited to the embodiments described above and can be modified as appropriate. For example, although an example where the lead-in area 5a is provided in the first recording layer (in this case, the L0 recording layer 5) counting from the direction of emission of the emitted laser La is described in the above embodiments, the multilayer optical recording medium according to the present invention is not limited to this, and like a multilayer optical recording medium 1A shown in FIG. 6, it is possible to provide the lead-in area 3a in the same way as the lead-in area 5a of the multilayer optical recording medium 1 in a recording layer (in this case, the L1 recording layer 3) aside from the first recording layer counting from the direction of emission (the direction of the arrow A) of the emitted laser La. In this case, the L0 recording layer 5 is not formed at a position that overlaps the basic information recording area 3b in the thickness direction of the multilayer optical recording medium 1A, so that in the same way as when focusing on the multilayer optical recording medium 1, the focal point of the emitted laser La can be quickly and reliably set on the lead-in area 3a. The number (N) of recording layers for the present invention is not limited to two as in the multilayer optical recording media 1, 1A, and three or more layers may be included. By providing a lead-in area on only one out of the plurality of recording layers, it is possible to fully achieve the same effects of the invention as the multilayer optical recording media 1, 1A.

Also, in the above embodiments, a rewritable multilayer optical recording medium 1 where both the L0 recording layer 5 and the L1 recording layer 3 include phase change films is described as one example, although a multilayer optical recording medium according to the present invention is not limited to this, and the present invention can be applied to a write-once multilayer optical recording medium where both recording layers are formed of an inorganic material or an organic dye material.

INDUSTRIAL APPLICABILITY

As described above, according to this multilayer optical recording medium, a data management information recording area, for recording data management information on all of the data recorded in respective data recording areas of respective recording layers, is formed on only one of the N recording layers, so that by merely accessing one data management information recording area, it is possible to quickly read data management information on all of the data recorded on the multilayer optical recording medium. This means that it is possible to quickly and easily decide the recording start position of the data, so that it is possible to realize a multilayer optical recording medium that can considerably reduce the overall processing time of the recording process including the recording of the data management information. For the reproduction of the recorded data also, it is possible to realize a multilayer optical recording medium for which the recorded data can be quickly and easily reproduced by merely reading the data management information from one data management information recording area.

The invention claimed is:

1. A writable multilayer optical recording medium comprising a plurality of recording layers, in which data recording areas for recording data are respectively located, laminated on at least one surface of a base,
wherein a data management information recording area for recording data management information for all data recorded in the data recording areas of the recording layers is located on only one of the plurality of recording layers, the data management information recording area being located closer to a center of the multilayer optical recording medium than an innermost peripheral part of any of the recording layers other than the one recording layer on which the data management information recording area is located.

2. A multilayer optical recording medium according to claim 1,
wherein the data management information recording area is located in a recorded layer closest to a side of the multilayer optical recording medium on which a laser beam is irradiated during one of a data reproduction process and a data recording process.

3. A method for recording data on a writable multilayer optical recording medium comprising a plurality of recording layers, in which data recording areas for recording the data are respectively located, laminated on at least one surface of a base, comprising:
recording data in at least one of the data recording areas, and
recording data management information for all the recorded data in a data management information recording area, the data management information recording area being located on only one of the plurality of recording layers, and being located closer to a center of the multilayer optical recording medium than an innermost peripheral part of any of the recording layers.

4. A method for recording data according to claim 3, further comprising successively moving a focus position of a laser beam in an emission direction when focusing on the data management information recording area.

5. A method for recording data according to claim 3,
wherein the data management information recording area is located in a recording layer located closest to a side of the multilayer optical recording medium on which a laser beam is irradiated during one of a data reproduction process and a data recording process.

6. A method for recording data according to claim 4,
wherein the data management information recording area is located in a recording layer located closest to a side of the multilayer optical recording medium on which a laser beam is irradiated during one of a data reproduction process and a data recording process.

7. A recorder configured to perform the method of recording data according to claim 3, comprising:
a recorder that records the data and the data management information on the multilayer optical recording medium; and
a recording controller that controls a recording process performed by the recorder,
wherein the recording controller controls the recorder to record the data management information in the data management information recording area.

8. A recorder configured to perform the method of recording data according to claim 4, comprising:
a recorder that records the data and the data management information on the multilayer optical recording medium; and
a recording controller that controls a recording process performed by the recorder,
wherein the recording controller controls the recorder to record the data management information in the data management information recording area.

9. A recorder configured to perform the method of recording data according to claim 5, comprising:
- a recorder that records the data and the data management information on the multilayer optical recording medium; and
- a recording controller that controls a recording process performed by the recorder,
- wherein the recording controller controls the recorder to record the data management information in the data management information recording area.

10. A recorder configured to perform the method of recording data according to claim 6, comprising:
- a recorder that records the data and the data management information on the multilayer optical recording medium; and
- a recording controller that controls a recording process performed by the recorder,
- wherein the recording controller controls the recorder to record the data management information in the data management information recording area.

* * * * *

UNITED STATES PATENT AND TRADEMARK OFFICE
CERTIFICATE OF CORRECTION

PATENT NO. : 7,158,466 B2  Page 1 of 1
APPLICATION NO. : 10/496002
DATED : January 2, 2007
INVENTOR(S) : Toshifumi Tanaka It is certified that error appears in the above-identified patent and that said Letters Patent is hereby corrected as shown below:

At column 14, line 8 of the printed patent, "in a recorded layer" should be --in a recording layer--

Signed and Sealed this

Twenty-seventh Day of May, 2008

JON W. DUDAS
*Director of the United States Patent and Trademark Office*